United States Patent
Peters

(10) Patent No.: US 6,917,387 B2
(45) Date of Patent: Jul. 12, 2005

(54) ARRANGEMENT FOR TIME-CORRECT COMBINATION OF TWO DATA STREAMS

(75) Inventor: Matthias Peters, Neu Wulmstorf (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 519 days.

(21) Appl. No.: 10/144,432

(22) Filed: May 13, 2002

(65) Prior Publication Data

US 2002/0181638 A1 Dec. 5, 2002

(30) Foreign Application Priority Data

May 16, 2001 (DE) .......................... 101 23 786

(51) Int. Cl.$^7$ .............................. H04N 5/04; H04N 5/08; H04N 9/74
(52) U.S. Cl. ...................... 348/500; 348/525; 348/533; 348/598; 348/531
(58) Field of Search ................................. 348/584, 598, 348/599, 500, 518, 525, 533, 531, 512, 385.1, 484; H04N 9/74, 5/04, 5/08, 9/76

(56) References Cited

U.S. PATENT DOCUMENTS

| | | | | |
|---|---|---|---|---|
| 4,532,547 A | * | 7/1985 | Bennett | 348/518 |
| 5,633,688 A | * | 5/1997 | Choi et al. | 348/584 |
| 5,914,757 A | * | 6/1999 | Dean et al. | 348/584 |

* cited by examiner

Primary Examiner—Sherrie Hsia
(74) Attorney, Agent, or Firm—Michael J. Ure

(57) ABSTRACT

Methods and apparatus are described for time-correct combination of two data streams, particularly video data streams. In this case, a sync signal of the first video data stream is a horizontal sync signal. In this case, methods and apparatus are provided to combine the two video data streams in a pixel-precise manner, even though time base error, i.e. discontinuities occur in the second video data stream.

6 Claims, 1 Drawing Sheet

ARRANGEMENT FOR TIME-CORRECT COMBINATION OF TWO DATA STREAMS

Figure 1:
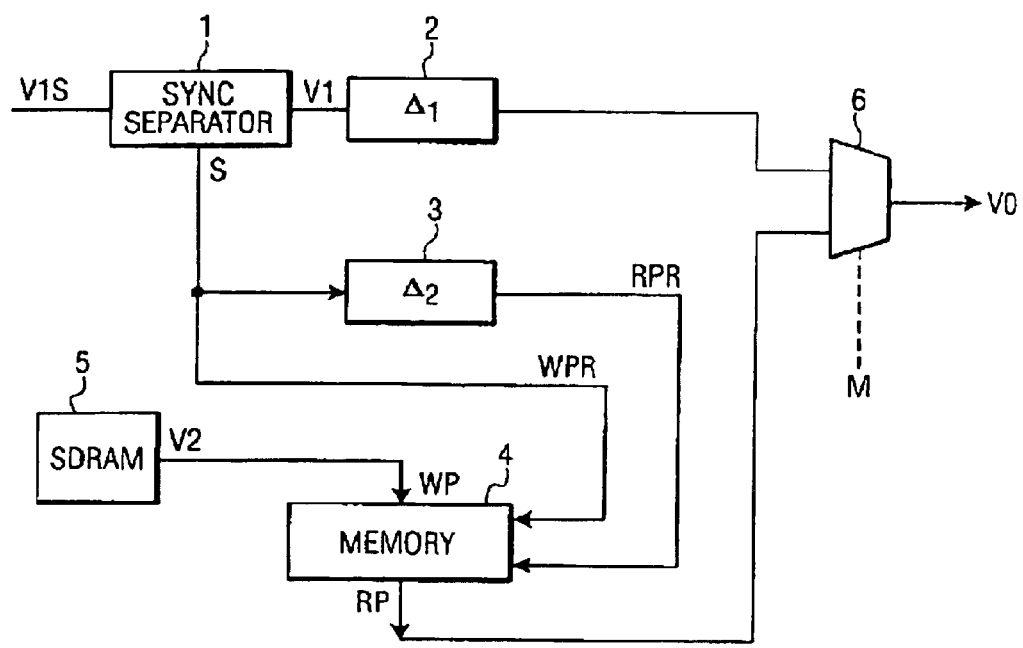

The invention relates to an arrangement for time-correct combination of a first, continuous digital data stream, comprising a sync signal, with a second, discontinuous digital data stream.

When combining such data streams, there may be a wish to combine them in a time-correct manner, i.e. in a given, constant temporal relation to each other. A problem occurs when a data stream is not time continuously present but when its bits occur with time fluctuations, i.e. discontinuities of a temporal nature in the data stream.

Also when buffer memories are used for this purpose, as is known from the state of the art, which are read in a given rhythm, this problem may still occur because reading of a memory may be subject to given time fluctuations, for example, when other reading or writing processes take place simultaneously in the memory.

It is an object of the invention to provide an arrangement of the type described in the opening paragraph in which the time-correct combination of both data streams is achieved.

According to the invention, this object is solved by the following characteristic features.

An arrangement for time-correct combination of a first, continuous digital data stream, comprising a sync signal, with a second, discontinuous digital data stream, the arrangement comprising:

- a first delay member delaying the first data stream by a first predetermined period of time,
- a second delay member delaying the sync signal of the first data stream by a second predetermined period of time,
- a memory in which the second data stream is written in accordance with a write pointer and from which it is read in accordance with a read pointer, the write pointer being reset by each pulse of the undelayed sync signal of the first data stream, and the read pointer being reset by each pulse of the sync signal of the first data stream delayed by means of the second delay member, i.e. set at the start of the memory, and
- means for combining or processing the output data streams of the first delay member and the memory, wherein the first period of time is chosen to be such that the output data streams of the first delay member and the memory occur at the means for combining or processing in a desired temporal relation to each other, and wherein the second period of time is chosen to be such that the read pointer does not catch up with the write pointer during the process of reading from the memory, also when taking the discontinuities occurring in the second data stream into account.

The first data stream is continuous, i.e. the time base with which it is transmitted is not subject to any substantial fluctuations. This first data stream comprises a sync signal which is used in the arrangement according to the invention for synchronizing the second data stream.

In contrast to the first data stream, the second data stream is discontinuous, i.e. the data transmitted in this stream are not transmitted in a constant time frame but this time frame is subject to fluctuations.

When these two data streams are combined without taking any further measures, bits of different positions in the two data streams are combined with each other in dependence upon the magnitude of the time base fluctuations in the second data stream.

According to the invention, this is avoided by a special memory which operates with a write pointer and a read pointer, as well as by a special control of the pointers.

The write pointer indicates the position of the memory in which the next data are currently being written. The position of the read pointer indicates the position from which the next data are read from the memory. The memory is used for buffering the second data stream and writing it into or reading it from this memory in accordance with these two pointers.

The write pointer is reset by each pulse of the undelayed sync signal of the first data stream, i.e. at the start of the memory. After the occurrence of such a pulse, the data of the second data stream are written into the memory from this point.

The read pointer is reset whenever a pulse occurs in the sync signal of the first data stream, delayed by means of a second delay member. Since this signal used for resetting the read pointer occurs with a time offset with respect to the signal for resetting the write pointer, namely by the time offset by which the second delay member supplies the sync signal, the reset process of the read pointer will accordingly take place at a later stage. This means that the read process in the memory starts in a time-delayed manner with respect to the write process.

Consequently, fluctuations in the time base of the second data stream can be compensated because, due to the lead which the write pointer has with respect to the read pointer, possibly occurring discontinuities during the write process do not directly have an effect on the read process which takes place in a time-delayed manner. The delay time of the sync signal, i.e. the period of time with which the second delay member delays the sync signal is to be chosen in such a way that the read pointer does not catch up with the write pointer during a read process in the memory. It may occur that the write pointer is slower because of discontinuities during a limited period, i.e. is switched to new positions, as compared with a read pointer. In this situation, the read pointer tendentially catches up the write pointer. The second period of time is to be chosen in such a way that during a write or read process in the memory, the write process always takes place first and the read process takes place at a later stage, also when taking such discontinuities into account.

Since, based on this conception, the signals read from the memory are delayed in a relatively temporal way, a first delay member is provided which delays the first data stream by such a period of time that the data read from the memory and the data coming from the first delay member occur at means for combining or processing these data in a desired temporal relation to each other. In other words, the delay which occurs due to the write and read process and the offset of the read pointer with respect to the write pointer in the memory is compensated by the first delay member.

Due to the arrangement according to the invention, time base fluctuations in the second data stream can be completely compensated and the two data streams can be bit-precisely combined with each other in the desired way.

This is particularly important when the data streams are video data streams. In this case, the sync signal of the first video data stream is a horizontal sync signal. In this case, the arrangement according to the invention can be advantageously used to combine the two video data streams pixel-precise, even though time base errors, i.e. discontinuities occur in the second video data stream.

For using the arrangement according to the invention for such video data streams, it is advantageous to form the memory as a line memory which is capable of storing the data of a picture line of the second data stream. At each pulse of the horizontal sync signal of the first video data stream, the write pointer of this line memory is then reset in an undelayed manner. The read pointer is also reset, but delayed by the predetermined second period of time. This is always effected at the end of a picture line so that the next picture line can be written again at the start of the line memory and read in a time-delayed manner in accordance with the position of the read pointer.

The discontinuities of the second data stream or video data stream may have several causes. For example, the second video data stream may come from an external SDRAM and the discontinuities may be caused by reading from this SDRAM. This is a relatively frequent situation in processing video signals. These discontinuities may also be caused, for example, by the fact that the SDRAM also stores other data which must be written into or read from this SDRAM. Consequently, time delays may occur during the read process of video data from the SDRAM because the other data may have to be written or read first.

When the arrangement according to the invention is used for video data streams, it may be advantageously adapted to combine the data streams for the purpose of noise reduction of the first or second video data stream.

Another advantageous use of the arrangement according to the invention for video data streams is to combine the data streams for generating a picture-in-picture function.

The arrangement according to the invention is therefore particularly suitable for processing video data streams because it is actually important that no time base fluctuations are present in the two data streams when they are combined and that the data streams are pixel-precisely combined with each other. If this is not the case, picture disturbances occur in the combined signal. These disturbances can be prevented by the arrangement according to the invention.

These and other aspects of the invention are apparent from and will be elucidated with reference to the embodiments described hereinafter.

In the drawings:

the sole FIGURE is a block diagram of an arrangement according to the invention for combining a first video data stream V1S and a second video data stream V2.

The first video data stream V1S comprises a sync signal S. It is assumed that the first video data stream V1 or V1S does not have any disturbing time base fluctuations, i.e. it is a continuous data stream.

The second video data stream V2 has, however, time base fluctuations, i.e. the individual bits or bytes of these signals do not occur at a constant temporal distance with respect to each other or within a fixed time frame. These discontinuities of the second video data stream are eliminated by means of the arrangement according to the invention so that the two video data streams can be combined with each other.

The block diagram in the FIGURE shows a separating stage 1 in which the first video data stream V1S is separated from its sync signal S. The first video data stream V1 is subsequently applied to a first delay member 2 in which it is delayed by a first predetermined period of time whose length will be further explained below.

The sync signal separated from the first video data stream V1S, which is a horizontal sync signal, is applied to a second delay member 3 which delays this signal by a second predetermined period of time. The correspondingly delayed signal supplied by the second delay member 3 is used as a reset signal for a read pointer of a line memory 4 and is denoted by RPR in the FIGURE.

The undelayed horizontal sync signal S of the first video data stream is applied in an undelayed manner as signal WPR to the line memory 4 and is used as a reset signal for a write pointer of this line memory 4.

In the embodiment shown in the FIGURE, it is assumed that the second video data stream V2 comes from an external memory, particularly an SDRAM 5. The process of reading data from the SDRAM 5 may be effected discontinuously, for example, because the SDRAM 5 is also used for storing other data. As already explained above, the video data stream V2 is discontinuous and is applied to the line memory 4 which can take up a line of a video data stream.

The location in the memory in which the current video data of the second video data stream V2 are written in the line memory 4 is determined by a write pointer which is denoted by WP in the FIGURE. The position of the write pointer is changed permanently, i.e. when a given location of the line memory 4 is written with new data, the write pointer moves to the next free location.

The write pointer is reset by the signal WPR. This means that upon every occurrence of a pulse in the horizontal sync signal of the first video data stream V1S, the write pointer WP of the line memory 4 is reset to its start. Subsequently, data of the second video data stream V2 are written into the line memory 4 in accordance with the continuously further shifting position of the write pointer.

Simultaneously, a read process takes place in the line memory 4, in accordance with a read pointer denoted by RP in the FIGURE. The reset process is performed by the horizontal sync signal of the first video data stream, delayed by means of the second delay member 3. It is achieved by this delay that the read pointer is reset later so that also the read process takes place in a time-delayed manner. In other words, the read pointer trails the write pointer during the read process.

When discontinuities occur in the time base of the second video data stream V2, it may happen that the write pointer moves more slowly than the read pointer during a limited period, because, as is generally the case, fewer data of the second video data stream occur during this period. Of course, the reverse case may also occur, namely more data than usual occur so that the position of the write pointer moves further away again from that of the read pointer.

The delay of the horizontal sync signal of the first video data stream V1S effected by means of the second delay member 3 is to be chosen in such a way that, also when such discontinuities occur during a read process of the data from the line memory 4, the read pointer RP can never catch up with the write pointer WP, i.e. it cannot reach its position.

The value of the second delay period should thus be adjusted in accordance with the magnitude of the discontinuities in the second video data stream.

In accordance with the write pointer WP, the read process in the line memory 4 is effected by means of the read pointer RP in such a way that the position of the read pointer in the line memory 4 is permanently changed after a reset, i.e. after reading data of a given location in the line memory 4, the read pointer moves to the next position so that the data are read first from this position.

Due to the above-explained mode of operation of the second line memory 4, the data stream read in accordance with the read pointer from the line memory 4 occurs in a time-delayed manner. However, now it is present as a continuous data stream because the position of the read pointer is changed time-continuously in the desired way so that the video data that have been read are present in a continuous manner.

However, a time delay occurs due to writing and reading into or from the line memory 4, which is compensated by means of the first predetermined period of time of the first delay member 2 in such a way that the first video data stream 1 is delayed by such a period of time that a desired, mutual temporal relation between the output signals of a first delay member 2 and the output signals of the line memory 4 is obtained.

These two signals are applied to means 6 for processing or combining these two signals and are to occur at the inputs of these means 6 in the desired mutual temporal relation.

In the embodiment shown in the FIGURE, the means 6 is a multiplexer controlled by a control signal M and supplying a video signal VO at its output. In the embodiment shown in the FIGURE, a picture-in-picture function can be generated in this manner. For such a function, the two combined video signals must be exactly present in a desired or required temporal relation which is achieved by means of the arrangement according to the invention, even though the second video data stream V2 is discontinuously read from the external SDRAM 5 and is thus discontinuously present.

Dependent on its use, the arrangement according to the invention may be provided with a memory which is different from the line memory 4. The arrangement according to the invention is not only usable for video data streams but basically also for any data stream.

Due to the line memory 4 of the arrangement according to the invention and the special mode of resetting the write pointer and the read pointer, it is achieved that discontinuities in one of the data streams are completely compensated. The delay times then occurring are compensated by the first delay memory 2.

As a result, the arrangement according to the invention supplies the two data streams in the desired, mutual temporal relation, without any discontinuities.

What is claimed is:

1. An arrangement for time-correct combination of a first, continuous digital data stream (V1), comprising a sync signal (S), with a second, discontinuous digital data stream (V2), the arrangement comprising:

a first delay member (2) delaying the first data stream (V1) by a first predetermined period of time, a second delay member (3) delaying the sync signal (S) of the first data stream (V1) by a second predetermined period of time, a memory (4) in which the second data stream (V2) is written in accordance with a write pointer (WP) and from which it is read in accordance with a read pointer (RP), the write pointer (WP) being reset by each pulse of the undelayed sync signal (S; WPR) of the first data stream (V1), and the read pointer (RP) being reset by each pulse (RPR) of the sync signal of the first data stream (V1) delayed by means of the second delay member (3), i.e. set at the start of the memory (4), and means (6) for combining or processing the output data streams of the first delay member (2) and the memory (4), wherein the first period of time is chosen to be such that the output data streams of the first delay member (2) and the memory (4) occur at the means (6) for combining or processing in a desired temporal relation to each other, and wherein the second period of time is chosen to be such that the read pointer (RP) does not catch up with the write pointer (WP) during the process of reading from the memory (4), also when taking the discontinuities occurring in the second data stream (V2) into account.

2. An arrangement as claimed in claim 1, characterized in that the data streams (V1, V2) are video data streams, the first of which comprises a horizontal sync signal as a synchronizing signal (S).

3. An arrangement as claimed in claim 1, characterized in that a line memory is provided as memory (4), which is capable of storing the data of a picture line of the second video data stream (V2).

4. An arrangement as claimed in claim 1, characterized in that the second video data stream (V2) comes from an external SDRAM (5) and the discontinuities of this data stream are produced by the process of reading from this SDRAM (5).

5. An arrangement as claimed in claim 1, characterized in that the means (6) for combining or processing the output data streams of the first delay member (2) and the memory (4) serve for a noise reduction of the first or the second video data stream (V1; V2).

6. An arrangement as claimed in claim 1, characterized in that the means (6) for combining or processing the output data streams of the first delay member (2) and the memory (4) are used to combine one of the video data streams (V1; V2) with the other video data stream (V1; V2) in such a way that a picture-in-picture function is realized.

* * * * *